US009309329B2

(12) United States Patent
Ness et al.

(10) Patent No.: US 9,309,329 B2
(45) Date of Patent: Apr. 12, 2016

(54) METHOD FOR PREPARING PH-INSENSITIVE SURFACTANT FREE POLYMER PARTICLE DISPERSION IN AQUEOUS MEDIUM

(75) Inventors: Jason S. Ness, Norristown, PA (US); Noah E. Macy, Royersford, PA (US)

(73) Assignee: Arkema Inc., King of Prussia, PA (US)

( * ) Notice: Subject to any disclaimer, the term of this patent is extended or adjusted under 35 U.S.C. 154(b) by 225 days.

(21) Appl. No.: 13/076,780

(22) Filed: Mar. 31, 2011

(65) Prior Publication Data

US 2011/0251329 A1 Oct. 13, 2011

Related U.S. Application Data

(60) Provisional application No. 61/321,565, filed on Apr. 7, 2010.

(51) Int. Cl.
| | |
|---|---|
| *C08F 2/22* | (2006.01) |
| *C08L 53/00* | (2006.01) |
| *C09D 153/00* | (2006.01) |
| *C08F 293/00* | (2006.01) |
| *C09J 153/00* | (2006.01) |

(52) U.S. Cl.
CPC .............. *C08F 2/22* (2013.01); *C08F 293/005* (2013.01); *C09D 153/00* (2013.01); *C09J 153/00* (2013.01); *C08F 2438/02* (2013.01)

(58) Field of Classification Search
CPC ..... C08F 2/22; C08F 293/005; C09D 153/00; C09J 153/00
USPC ........................................................ 524/460
See application file for complete search history.

(56) References Cited

U.S. PATENT DOCUMENTS

| | | | |
|---|---|---|---|
| 7,632,883 B2 | 12/2009 | Lach et al. | |
| 7,635,740 B2 * | 12/2009 | Charleux et al. | 526/220 |
| 7,671,152 B2 | 3/2010 | Parker et al. | |
| 8,481,631 B2 | 7/2013 | Dire et al. | |
| 2006/0078800 A1 | 4/2006 | Konabe | |
| 2007/0082993 A1 | 4/2007 | Amin-Sanayei | |
| 2007/0142513 A1 | 6/2007 | Tsuda | |
| 2007/0218089 A1 | 9/2007 | Dyllick-Brenzinger et al. | |
| 2008/0108749 A1 | 5/2008 | Chen | |
| 2008/0306196 A1 | 12/2008 | Irie et al. | |
| 2011/0110989 A1 | 5/2011 | Simonnet et al. | |

FOREIGN PATENT DOCUMENTS

| | | |
|---|---|---|
| EP | 0544569 | 6/1993 |
| JP | 2004-323759 A | 11/2004 |
| JP | 2005-113058 A | 4/2005 |
| WO | WO 2006/043942 | 4/2006 |

OTHER PUBLICATIONS

Guillaume, D. et al. Surfactant-Free Synthesis of Amphiphilic Diblock Copolymer Nanoparticles via Nitroxide-Mediated Emulsion Polymerization, Chem. Commun., 2005, pp. 614-616.
Freal-Saison. S., et al., Emulsifer-Free Controlled Fre-Radical Emulsion Polymerization of Styrene via RAFT Using Dibenzyltrithiocarbonate as a Chain Transfer Ageent and Acyylic . . . , Macromolecules, 39, 2006, pp. 8632-8638.
Delaittre, G., et al. Kinetics if on-situ Formation of Poly(acrylic acid)-b-ppolystyrene Amphiphiliic Block Copolymers via Nitroxide-Mediated Controlled Fre-Radical . . . Macromolecules, 41, 2008, pp. 2361-2367.
Rigger, J., wt al., Amphiphilic Poly(ethylene oxide) Macromolecular RAFT Agent as a Stabilizer and Control-Agent in ab Initio Batch Emulsion Polymerization, Macromolecules, 41, 2008, pp. 4065-4068.
Stoffelbach, F, et al., Surfactant-Free, Controlled/Living Radical Emulsion Polymerization in Batch Conditions Using a Low Molar Mass, Surface-Active Reversible Addition-Fragmentation . . . , Macromolecules, 41, 2008, pp. 7850-7856.
Rieger, J., et al., Surfactant-Free Controlled/Living Radical Emulsion (Co) polymerization of n-Butyl Acrylate and Methyl Methacrylate via RAFT Using Amphiphilic . . . , Macromolecules, 42, 2009, pp. 5518-5525.
Dire, C., et al., Nitroxide-Mediated Controlled/Living Free-Radical Surfactant-Free Emulsion Polymerization of Methyl Methacrylate Using a Poly(methacrylic acid)-Based Macroalkoxyamine Initiator, Macromolecules, 42, 2009, pp. 95-103.
Delaittre, G., et al. Aqueous Suspension of Amphiphilic Diblock Copolymer Nanoparticles Prepared in situ from a Water-Soluble Poly(sodium acrylate) Alkoxyamine Macroinitiator, Soft Matter, 2, 2005, pp. 223-231.

\* cited by examiner

*Primary Examiner* — David W Wu
*Assistant Examiner* — Marie Reddick
(74) *Attorney, Agent, or Firm* — Steven D. Boyd

(57) ABSTRACT

The invention provides a polymer particle dispersion in an aqueous medium and a method of making the same, which comprises an emulsion polymerized polymer and a macroinitiator covalently bonded to the emulsion polymerized polymer. The living macroinitiator comprises a hydrophilic, pH-insensitive monomer in reacted form. The polymer particle dispersion may be obtained by reacting at least one monomer with the living macroinitiator and without a surfactant to effect polymerization of the monomer(s). The emulsion polymerized polymer may be comprised of at least one additional ethylenically unsaturated monomer in polymerized form.

8 Claims, No Drawings

METHOD FOR PREPARING PH-INSENSITIVE SURFACTANT FREE POLYMER PARTICLE DISPERSION IN AQUEOUS MEDIUM

FIELD OF THE INVENTION

The invention relates to a polymer particle dispersion in an aqueous medium and a method of making the same.

BACKGROUND OF THE INVENTION

Polymer particle dispersions or emulsions are used in a number of applications, such as adhesives, paints, paper coatings, textile coatings, etc. Emulsion polymerization is a type of radical polymerization often used to form dispersions of polymer particles that usually begin with an emulsion incorporating water, at least one monomer, and surfactant(s). Surfactants are often critical in conventional emulsion polymerization because the surfactant provides sites for particle nucleation (i.e., monomer swollen micelles), controls latex particle size, and provides colloidal stability to the formed polymer particles. However, for many latex applications, small molecule surfactants have several disadvantages. For example, small molecule surfactants can impart high water sensitivity to films (leading to blush) and can desorb during film formation (detracting from surface properties and final performance).

There have been recent developments in providing effective emulsion polymerizations without the need for a surfactant, however. For example, an American Chemical Society manuscript entitled "Nitroxide-Mediated Controlled/Living Free-Radical Surfactant-Free Emulsion Polymerization of Methyl Methacrylate Using a Poly(methacrylic acid)-Based Macroalkyoxyamine Initiator" by Charleux et al. (*Macromolecules* 2009, 42, 95-103) describes the use of certain macroinitiators in a surfactant-free emulsion polymerization. In particular, a poly(methacrylic acid)-based polymer, such as poly(methacrylic acid-co-styrene) is described as a living macroinitiator used in a surfactant-free, batch emulsion polymerization.

It has been found, however, that emulsion polymerization using macroinitiators based on acrylic acid, methacrylic acid-co-styrene or methacrylic acid-co-styrene sulphonate sodium salt, for example, requires the latex to have a basic pH. This is because a low pH emulsion may lead to latex instability and coagulation, especially at higher solids contents, during synthesis or shortly thereafter.

SUMMARY OF THE INVENTION

Aspects of the present invention include eliminating or reducing the pH sensitivity of the latex and allowing it to remain stable at all pH values, especially at low pH values (e.g., less than 7). The present invention includes a specific macroinitiator, which imparts pH insensitivity to the polymer emulsion. Due to this improvement, the pH need not be maintained at a specific basic value (e.g., a buffer is not required). Thus, the present invention provides for a robust process for manufacturing high solids, stable polymer particle dispersions using a pH-insensitive macroinitiator and surfactant-free controlled radical emulsion polymerization.

According to an embodiment of the present invention, a polymer particle dispersion in an aqueous medium comprises an emulsion polymerized polymer and a macroinitiator, which comprises a hydrophilic, pH-insensitive monomer in reacted (e.g., polymerized) form, covalently bonded to the emulsion polymerized polymer. The emulsion polymerized polymer is comprised of at least one additional ethylenically unsaturated monomer in polymerized form.

According to another embodiment of the present invention, a living macroinitiator having the formula $R-\{[(A)_x(B)_y]-Y\}_{n \text{ or } 1}$, where A is a hydrophilic, pH-insensitive monomer, B is a comonomer, Y is a terminal group, $x \geq 1$, $y \geq 0$, and $n \geq 2$, wherein A and B may appear in any order or sequence; and R is of the formula (I) or (III):

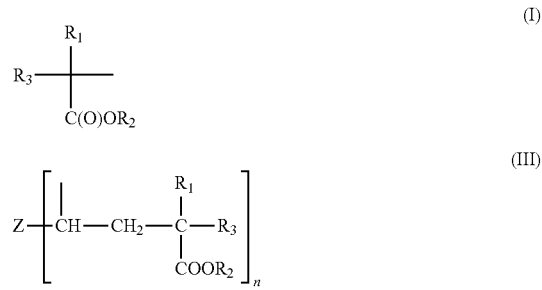

wherein $R_1$ and $R_3$, identical or different, represent a linear or branched alkyl group, with the number of carbon atoms from 1 to 3; $R_2$ represents a hydrogen atom, a linear or branched alkyl group having a number of carbon atoms from 1 to 8, a phenyl group, an alkaline metal ion, or an ammonium ion; and Z represents an aryl group or a group of the formula $Z_1-[X-C(O)]_n$, in which, $Z_1$ represents a polyfunctional structure where X is an oxygen atom, a nitrogen atom carrying a carbon group, a hydrogen atom, or a sulfur atom. For example, R may be a dimethylcarboxyl group, and Y may be R' of the formula (II).

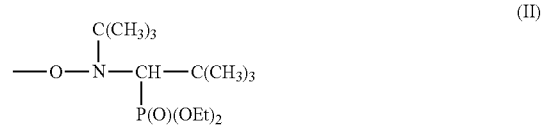

More specifically, R' may be N-tert-butyl-N-(1-diethylphosphono-2,2-dimethylpropyl) nitroxide.

According to another embodiment of the present invention, the living macroinitiator is reacted with at least one monomer to form a polymer of the formula $R-\{[(A)_x(B)_y]-[(C)_m]_p-Y\}_{n \text{ or } 1}$, where A is the hydrophilic, pH-insensitive monomer, B is a comonomer, C is at least one ethylenically unsaturated monomer, Y is a terminal group, $x \geq 0$, $y \geq 0$, $m \geq 1$, $n \geq 2$, and $p \geq 1$, wherein if $p > 1$ each C segment has a distinct composition, and A and B may appear in any order or sequence within the living macroinitiator, and R is of the formula (I) or (III):

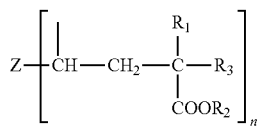

(III)

wherein $R_1$ and $R_3$, identical or different, represent a linear or branched alkyl group, with the number of carbon atoms from 1 to 3; $R_2$ represents a hydrogen atom or a linear or branched alkyl group having a number of carbon atoms from 1 to 8, a phenyl group, an alkaline metal ion, or an ammonium ion; and Z represents an aryl group or a group of the formula $Z_1$—[X—C(O)]$_n$, in which, $Z_1$ represents a polyfunctional structure where X is an oxygen atom, a nitrogen atom carrying a carbon group, a hydrogen atom, or a sulfur atom.

According to another embodiment of the present invention, a method of making a polymer particle dispersion includes reacting at least one monomer with a macroinitiator and without a surfactant to effect polymerization of the at least one monomer, wherein the macroinitiator comprises a hydrophilic, pH-insensitive monomer in polymerized form and the at least one monomer is at least one of an ethylenically unsaturated monomer.

According to another embodiment of the present invention, a process to form a latex includes reacting a hydrophilic, pH-insensitive monomer and an alkoxyamine compound comprising a nitrogen-oxygen bond to form a macroinitiator. An aqueous emulsion is prepared comprising at least one monomer and the living macroinitiator, but exclusive of a surfactant. The emulsion is maintained under polymerization conditions to provide a latex containing dispersed polymer particles.

DETAILED DESCRIPTION OF THE INVENTION

Aspects of the present invention include polymer particle dispersions in an aqueous medium, and living macroinitiators comprising a pH-insensitive monomer in polymerized form used in the preparation of polymer particle dispersions.

As used herein, "latex," "lattices," and "polymer particle dispersion" may be used interchangeably to encompass any polymer particles known to those skilled in the art, which may be in the form of a stable aqueous colloidal suspension, emulsion, or dispersion or the polymer particles separated therefrom.

As used herein, unless specified otherwise, the values of the constituents or components are expressed in weight percent or % by weight of each ingredient. All values provided herein include up to and including the endpoints given.

In one embodiment of the present invention, a polymer particle dispersion in an aqueous medium comprises an emulsion polymerized polymer and a macroinitiator, which comprises a hydrophilic, pH-insensitive monomer in reacted form, covalently bonded to the emulsion polymerized polymer. The emulsion polymerized polymer is comprised of at least one additional ethylenically unsaturated monomer in polymerized form, such as (meth)acrylates, styrenes, (meth)acrylamides, (meth)acrylonitriles, and mixtures thereof.

The polymer particle dispersion comprises a macroinitiator, which is in reacted or polymerized form. Thus, while monomers are described, it will be understood to the skilled person that the macroinitiator comprises the monomers) in reacted form. In other words, the repeated units in the polymer are known as the "residue" of the monomer that formed that repeat unit. The polymers may be linear, branched, crosslinked, etc., or any combination thereof. The polymers may be homopolymers (i.e., built up from one type of monomer) or copolymers (built up from two or more types of monomer). Copolymers may have the monomer units arranged randomly, in blocks, in sequence, statistically, gradient, or any combination thereof. Gradient polymers include multicomponent polymers whose structures or compositions are not macroscopically homogenous, but vary as a function of position in the sample. The method of making the macroinitiator is described in detail below.

The macroinitiator acts as the initiator, stabilizer, and/or control agent during the controlled (or living) free-radical polymerization process. Chain extension of the macroinitiator with ethylenically unsaturated monomers produces amphiphilic block copolymers that self-assemble in situ, forming living micelles. As living polymerization continues these living micelles become self-stabilized polymer particles, without any need for conventional surfactants. The macroinitiator is no longer living after chain extension, but the final polymer particle dispersion is living, allowing for synthesis of complex polymer architectures in surfactant-free emulsion polymerization.

The living macroinitiator comprises a hydrophilic, pH-insensitive monomer or polymer. As used herein, "hydrophilic" and "water soluble" may be used interchangeably to describe a monomer that is readily dissolvable in an aqueous medium. In particular, the monomer may contain a hydrophilic molecule or portion thereof that is charge-polarized and capable of hydrogen bonding. The living macroinitiator is pH-insensitive and does not respond to changes in pH in the surrounding medium. For example, a pH-insensitive monomer or polymer will not swell or collapse in response to a change in pH. In particular, effective pH-insensitive monomers or polymers will remain water soluble regardless of the pH.

The living macroinitiator may include any suitable water soluble and pH-insensitive monomer or polymer. Suitable hydrophilic and pH-insensitive monomers may include those carrying a substituent or function/functionality chosen from the following: —OH, $CO_2H$, $SO_3H$, ammonium, phosphono- (e.g., —$PO_3H$), epoxide, amino, amide, and salts thereof.

The living macroinitiator may comprise nonionic monomers, anionic monomers, cationic monomers, and amphoteric monomers having an anionic nature and a cationic nature in one molecule. Nonionic monomers may be generally classified as pH-insensitive in nature. Suitable nonionic monomers may include, for example, N-vinylpyrrolidone, acrylamide and methacrylamide and their derivatives, and derivatives of acrylic and methacrylic acid. Anionic monomers may be pH-insensitive and may include those which in polymerized form are more acidic than poly(acrylic acid). Additionally, suitable pH insensitive monomers may include acidic monomers with a low pKa. As will be evident to one of skill in the art, the definition of a "low pKa" may vary based on the functional groups in the monomer, such as sulphonates, phosphonates, etc. Suitable anionic monomers may be selected from acrylic and methacrylic acid, maleic acid, maleic anhydride, or acrylates and methacrylates having a sulfonic acid group or a phosphoric acid group, for example.

In an exemplary embodiment, the living macroinitiator may comprises a monomer selected from 2-acrylamido-2-methylpropanesulfonic acid (AMPS) and salts thereof, vinyl benzyl phosphoric acid and salts thereof, dimethyl acrylamide, hydroxyethyl acrylate, glycidyl methacrylate, siloxane functional monomers, and mixtures thereof.

The living macroinitiator may comprise at least one water-soluble salt of a monomer comprising an acryloyl group ($H_2C$=CH—C(=O)—) and a sulfonic acid group (—S(=O)$_2$—OH) in polymerized form. In particular, the monomer comprising an acryloyl group and a sulfonic acid group may be 2-acrylamido-2-methylpropanesulfonic acid (AMPS).

The monomer may include a water-soluble salt. For example, a monovalent cation, such as sodium, lithium, potassium, and ammonium may be used to form the salt. Thus, for example, a water-soluble AMPS salt may include AMPSNa, AMPSLi, AMPSK, AMPSNH$_4$, etc. In an exemplary embodiment, the monomer is 2-acrylamido-2-methylpropanesulfonic acid sodium salt or sodium vinyl benzyl phosphonic acid. In reacted form, the monomer residue may be designated as "p" or "polymerized" (e.g., pAMPSNa).

The living macroinitiator, in polymerized form, may have the following formula:

where A is a hydrophilic, pH-insensitive monomer, B is a comonomer, Y is a terminal group, x≥1, y≥0, and n≥2, wherein A and B may appear in any order or sequence; and R is of the formula (I) or (III):

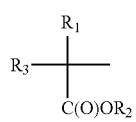

(I)

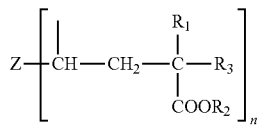

(III)

wherein $R_1$ and $R_3$, identical or different, represent a linear or branched alkyl group, with the number of carbon atoms from 1 to 3; $R_2$ represents a hydrogen atom, a linear or branched alkyl group having a number of carbon atoms from 1 to 8, a phenyl group, an alkaline metal ion, or an ammonium ion; and Z represents an aryl group or a group of the formula $Z_1$—[X—C(O)]$_n$, in which, $Z_1$ represents a polyfunctional structure where X is an oxygen atom, a nitrogen atom carrying a carbon group, a hydrogen atom, or a sulfur atom.

Y may include any suitable terminal group, which would be readily ascertainable by one of ordinary skill in the art. The terminal group may be terminal monomer units from any of the monomers described herein. In an exemplary embodiment, Y is R', which comprises formula (II):

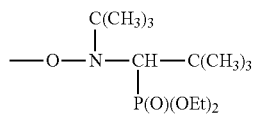

(II)

In one embodiment, R is a dimethylcarboxyl group and R' is N-tert-butyl-N-(1-diethylphosphono-2,2-dimethylpropyl) nitroxide.

For example, if A is AMPSNa where x is greater than 1 (e.g., pAMPSNa) and y is zero, the macroinitiator may look as follows, where the methacrylic acid fragment from BB-MA is ionized:

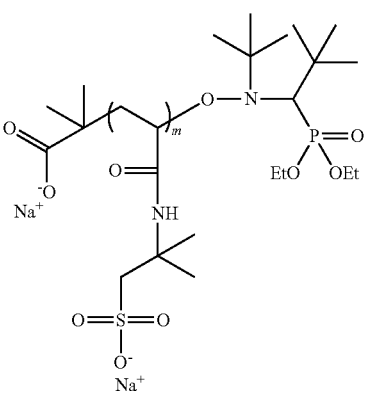

The pH-insensitive monomer is polymerized with an alkoxyamine initiator (e.g., an initiator containing an —N—O— bond capable of forming a nitroxide) to form the living macroinitiator. An aqueous living macroinitiator solution may be formed by performing a controlled radical polymerization of the hydrophilic, pH-insensitive monomer in the presence of an alkoxyamine compound having either formula (IV) or (V)

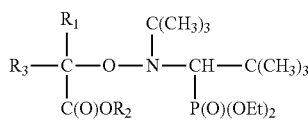

(IV)

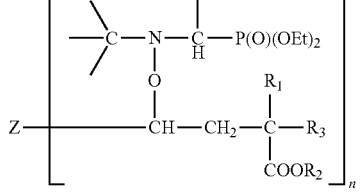

(V)

where $R_1$ and $R_3$ are the same or different and represent a linear or branched alkyl group, with the number of carbon atoms from 1 to 3. $R_2$ represents a hydrogen atom, a linear or branched alkyl group having a number of carbon atoms from 1 to 8, a phenyl group, an alkaline metal ion, or an ammonium ion. Z represents an aryl group or a group of the formula $Z_1$—[X—C(O)]$_n$, in which, $Z_1$ represents a polyfunctional structure where X is an oxygen atom, a nitrogen atom carrying a carbon group, a hydrogen atom, or a sulfur atom; and n≥2.

Preferably, the alkoxyamine initiator is a nitroxide-based alkoxyamine initiator. A suitable nitroxide-based alkoxyamine is N-(2-methylpropyl)-N-(1-diethylphosphono-2,2-dimethylpropyl)-O-(2-carboxylprop-2-yl) hydroxylamine (also known as BLOCBUILDER® or BB or BB-MA, which is available from Arkema Inc. with an office in Philadelphia, Pa.) having the following formula:

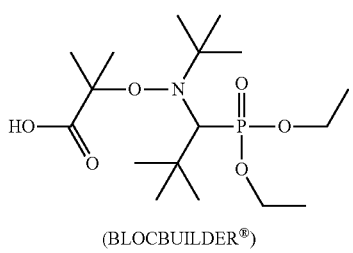 [SMILES: CCOP(=O)(OCC)C(N(OC(C)(C)C(=O)O)C(C)(C)C)C(C)(C)C]

(BLOCBUILDER®)

The BLOCBUILDER® initiator contains a nitroxide component, which is N-tert-butyl-N-(1-diethylphosphono-2,2-dimethylpropyl) nitroxide (also known as SG1 or SG-1, which is also available from Arkema Inc.) having the following formula:

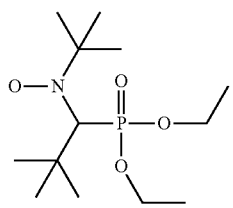

(SG1)

In order to further control the reaction between the alkoxyamine compound and the pH-insensitive monomer, a secondary or additional nitroxide compound may also be added. For example, during the controlled radical polymerization of the hydrophilic, pH-insensitive monomer and the alkoxyamine compound, N-tert-butyl-N-(1-diethylphosphono-2,2-dimethylpropyl) nitroxide (SG1) may be added.

The hydrophilic, pH-insensitive monomer or polymer may be copolymerized with other comonomers (B). For example, other comonomers may be selected to modify the properties of the living macroinitiator or reduce the costs by requiring less of the pH-insensitive components. Suitable comonomers (B) may include those that remain anionic in nature over a broad range of pH. For example, the living macroinitiator may include a non-sulfonated monomer copolymerized with the hydrophilic, pH-insensitive monomer. Additionally or alternatively, the living macroinitiator may include a sulfonated or a phosphonated monomer copolymerized with the hydrophilic, pH-insensitive monomer.

The polymer particle dispersion comprises an emulsion polymerized polymer (C). The emulsion polymerized polymer may be comprised of at least one additional ethylenically unsaturated monomer in polymerized form. For example, the emulsion polymerized polymer may comprise one or more monomers, in polymerized form, selected from the group consisting of (meth)acrylates, styrenes, (meth)acrylamides, (meth)acrylonitriles, and mixtures thereof. As used herein, the designation "(meth)," as would be recognized to one of ordinary skill in the art, is intended as an optional substituent. In other words, (meth)acrylates encompasses both acrylates and methacrylates. Additionally, the designation of "acrylates," "acrylamides," etc. is intended to encompass the esters, salts, and free acids of the compound, which may be used as the monomers described herein.

Suitable acrylates may include $C_1$-$C_{12}$ alkyl esters of acrylic acid, for example. Acrylic monomers may include, for example, acrylic acid or its salts, alkyl; cycloalkyl or aryl acrylates; methyl, ethyl, butyl, ethylhexyl or phenylacrylate; hydroxyalkyl acrylates; 2-hydroxyethyl acrylate; etheralkyl acrylates; 2-methoxyethyl acrylates; alkoxy or aryloxy polyalkylene glycol acrylates; methoxy polyethylene glycol acrylates; ethoxy polyethylene glycol acrylates, methoxy polypropylene glycol acrylates, methoxy polyethylene glycol/polypropylene glycol acrylates or their mixtures; aminoalkyl acrylates; 2-(dimethylamino)ethyl acrylate (DMAEA); amine salt acrylates; [2-(acryloyloxy)ethyl]trimethylammonium chloride or sulphate; [2-(acryloyloxy)ethyl] dimethylbenzylammonium chloride or sulphate; fluorinated acrylates, silylated acrylates or phosphorus-comprising acrylates; such as alkylene glycol phosphate acrylates. Preferred monomers may include butyl acrylate, methyl acrylate, ethyl acrylate, butyl acrylate, 2-ethylhexyl acrylate, decyl acrylate, etc.

Suitable methacrylates may include $C_1$-$C_{12}$ alkyl esters of methacrylic acid, for example. The methacrylate monomers may include, for example, methacrylic monomers; methacrylic acid or its salts; alkyl, cycloalkyl, alkenyl or aryl methacrylates; methyl, lauryl, cyclohexyl, allyl or phenyl methacrylates; hydroxyalkyl methacrylates; 2-hydroxyethyl methacrylate or 2-hydroxypropyl methacrylate etheralkyl methacrylates; 2-ethoxyethyl meth-acrylate; alkoxy or aryloxy polyalkylene glycol methacrylates; methoxy polyethylene glycol methacrylates, ethoxy polyethylene glycol methacrylates, methoxy polypropylene glycol methacrylates, methoxy polyethylene glycol/polypropylene glycol methacrylates or their mixtures; aminoalkyl methacrylates; 2-(dimethylamino)ethyl methacrylate (MADAME); amine salts methacrylates; [2-(methaeryloyloxy)ethyl]trimethylammonium chloride or sulphate and [2-(methacryloyloxy) ethyl]dimethylbenzylammonium chloride or sulphate fluorinated methacrylates; 2,2,2-trifluoroethyl methacrylate; silylated methacrylates; 3-methacryloyloxypropyltrimethylsilane; phosphorus-comprising methacrylates; alkylene glycol phosphate methacrylates, hydroxyethylimidazolidone methacrylate, hydroxyethylimidazolidinone methacrylate and 2-(2-oxo-1-imidazolidinyl)ethyl methacrylate.

Suitable styrenes may include styrene, substituted styrenes including $C_1$-$C_4$ alkyl substituted styrene, sodium styrenesulphonate, and halogenated styrenes, such as, alphamethylstyrene, 2-chlorostyrene, 4-chlorostyrene, bromostyrene, 2,5-dichlorostyrene and 4-methoxystyrene. Suitable acrylamide and methacrylamide monomers may include, for example, acrylamide, methacrylamide, N-methyl(meth)acrylamide, N-ethyl(meth)acrylamide, N,N-dimethyl(meth)acrylamide, N-isopropyl(meth)acrylamide, and N-t-octyl(meth)acrylamide. Suitable acrylonitriles and methacrylonitriles may also be selected by one of skill in the art.

The living macroinitiator and at least one monomer may be reacted to form a polymer of the following formula:

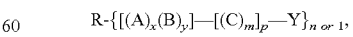

where A is the hydrophilic, pH-insensitive monomer, B is a comonomer, C is at least one ethylenically unsaturated monomer, Y is a terminal group, $x \geq 1$, $y \geq 0$, $m \geq 1$, $n \geq 2$, and $p \geq 1$, wherein if $p>1$ each C segment has a distinct composition, and A and B may appear in any order or sequence within the living macroinitiator, and R is of the formula (I) or (III):

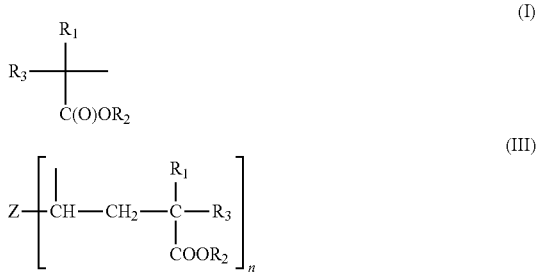

wherein $R_1$ and $R_3$, identical or different, represent a linear or branched alkyl group, with the number of carbon atoms from 1 to 3; $R_2$ represents a hydrogen atom or a linear or branched alkyl group having a number of carbon atoms from 1 to 8, a phenyl group, an alkaline metal ion, or an ammonium ion; and Z represents an aryl group or a group of the formula $Z_1$—[X—C(O)]$_n$, in which, $Z_1$ represents a polyfunctional structure where X is an oxygen atom, a nitrogen atom carrying a carbon group, a hydrogen atom, or a sulfur atom.

For example, Y may be R' of the formula (II):

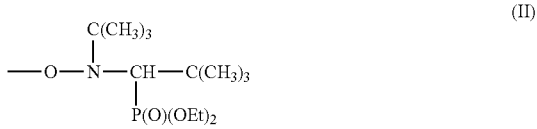

At least a portion of the macroinitiator is covalently bonded to the emulsion polymerized polymer. In other words, it is not necessary that all of the macroinitiator is covalently bonded to the emulsion polymerized polymer.

In one embodiment of the present invention, the emulsion polymerized polymer particles may comprise homopolymers, of a single type of monomer, or copolymers, of more than one type of monomer. The copolymers may be statistical, random, or gradient copolymers. The copolymers may contain one or more blocks selected from the group consisting of pure (meth)acrylic blocks, mixed (meth)acrylic blocks, and mixed (meth)acrylic/styrenic blocks. In one embodiment, the emulsion polymerized polymer comprises polybutylacrylate and polymethylmethacrylate. In another embodiment, the emulsion polymerized polymer comprises polybutylacrylate, poly methylmethacrylate, and polystyrene. In yet another embodiment, the emulsion polymeric polymer comprises polybutylacrylate, poly methylmethacrylate, and polymethacrylic acid.

The particle dispersion is in an aqueous medium. The preferred aqueous medium is water although other aqueous solvents including polar aprotic solvents may also be suitable. The water may be of any suitable type, e.g., distilled, deionized, treated, etc. The type and amount of aqueous medium is not especially limited, but may be employed in amounts to achieve adequate emulsification and to provide desired particle size and particle size distribution.

The present invention provides for stable polymer particle dispersions at all pH values. In particular, the dispersions are stable at low pH values (e.g., less than 7). In one embodiment of the present invention, the polymer particle dispersion has a pH less than 7. The dispersions were found to be stable even at very low pH values, on the order of about 3. Thus, the present invention reduced or eliminated the pH sensitivity of typical latex formulations. Accordingly, the pH need not be maintained at a specific basic value, and buffers are not required to maintain or achieve a necessary pH.

The stable lattices are particularly effective in applications, such as paint, coating, or adhesive compositions. Thus, a paint, coating, or adhesive composition may comprise the polymer particle dispersions described herein comprising an emulsion polymerized polymer and a macroinitiator, which comprises a hydrophilic, pH-insensitive monomer in reacted form, covalently bonded to the emulsion polymerized polymer.

The paint, coating, or adhesive composition may also comprise at least one additional paint, coating, or adhesive component. Paint components are known to those skilled in the art and may include, for example, pigments, binders, solvents, catalysts, thickeners, stabilizers, emulsifiers, texturizers, adhesion promoters, UV stabilizers, za flatteners (de-glossing agents), biocides, and the like. Coating components are also well known in the industry and may include, for example, defoamers, lubricants, plasticizers, etc. Adhesive components are also well known and may include, for example, defoamers, curing catalysts, dissociation catalysts, fillers, rheology modifiers, antioxidants, pigments, tackifiers, plasticizers, adhesion promoters, stabilizers, flame retardants, etc. These additives may be incorporated in a conventional manner and at any convenient point in the preparation of the latex or of the paint, coating, or adhesive compositions.

In an embodiment of the present invention, a method of making a polymer particle dispersion includes reacting at least one monomer with a living macroinitiator in an aqueous media and without a surfactant to effect polymerization of the at least one monomer, wherein the living macroinitiator comprises a hydrophilic, pH-insensitive monomer in polymerized form and the at least one monomer is an ethylenically unsaturated monomer.

As used herein, "surfactant free" or 'without a surfactant" is intended to encompass none or only trace amounts of surfactant. In other words, a surfactant is not purposefully added to the reaction medium.

The macroinitiator may be formed using any suitable techniques known in the art. In one embodiment of the present invention, the macroinitiator is formed by performing a controlled radical polymerization of the hydrophilic, pH-insensitive monomer and an alkoxyamine compound comprising a nitrogen-oxygen bond.

The controlled radical polymerization may be a nitroxide-mediated (NMP) or reversible-addition-fragmentation-transfer (RAFT) polymerization. Nitroxide-mediated polymerization (NMP) is well known to those skilled in the art and allows the propagating radical concentration to be limited to levels that allow controlled polymerization. Reversible-addition-fragmentation-transfer (RAFT) polymerization is also well known to those of ordinary skill in the art and is effective because stabilized radical intermediates reintroduce a radical capable of reinitiation or propagation with monomer(s) with limited termination reactions.

The macroinitiator may also be prepared with a reversible-addition-fragmentation-transfer (RAFT) agent. RAFT agents may include, for example, N,N'-azobis(isobutyronitrile) (AIBN), dibenzyl trithiocarboante (DBTTC), 1-phenylprop-2-yl phenyldithioacetate; 1-phenylethyl phenyldithioacetate, cumyl phenylditioacetate, 2-phenylprop-2-yl dithiobenzoate; 1-phenylprop-2-yl p-bromodithiobenzoate; 1-phenylethyl dithiobenzoate; 2-cyanoprop-2-yl dithiobenzoate; 4-cyanopentanoic acid dithiobenzoate; 1-acetoxyethyl dithiobenzoate; hexakis(thiobenzoylthiomethyl)benzene; 1,4-bis(thiobenzoylthiomethyl)benzene; 1,2,4,5-tetrakis(thiobenzoylthiomethyl)benzene; ethoxycarbonylmethyl dithioacetate; 2-(ethoxycarbonyl)prop-2-yl dithiobenzoate; tert-butyl dithiobenzoate; 1,4-bis(2-thiobenzoylthioprop-2-yl)benzene; 4-cyano-4-(thiobenzoylthio)pentanoic acid; dibenzyl trithiocarbonate; carboxymethyl dithiobenzoate; s-benzyl diethoxyphosphinyldothioformate; 2,4,4-trimethylpent-2-yl dithiobenzoate; 2-(ethoxycarboxyl)prop-2-yl dithiobenzoate; 2-phenylprop-2-yl 1-dithionaphthalate; 2-phenylprop-2-yl 4-chlorodithiobenzoate.

Other suitable ingredients may also be included in any of the polymerization reactions described herein. For example, acids, salts, chain transfer agents, initiators, reductants, and control agents, can also be employed in the preparation of the living macroinitiator or the polymer particle dispersion and may be incorporated at any suitable time.

According to another embodiment of the present invention, a process for forming the latex comprises:

(a) reacting a hydrophilic, pH-insensitive monomer and an alkoxyamine compound comprising a nitrogen-oxygen bond to form a living macroinitiator;

(b) preparing an aqueous emulsion comprising at least one monomer, the living macroinitiator, but exclusive of a surfactant; and (c) maintaining the emulsion under polymerization conditions to provide a latex containing dispersed polymer particles.

The hydrophilic, pH-insensitive monomer and the alkoxyamine compound are reacted, for example, in water, to form a macroinitiator. The living macroinitiator may be formed in an aqueous or non-aqueous solvent. If the living macroinitiator is formed in a non-aqueous solvent, the living macroinitiator may be later dissolved in an aqueous solvent. In an exemplary embodiment, the living macroinitiator is formed in an aqueous media, such as water, to provide an aqueous living macroinitiator solution.

Any suitable conditions may be selected to effectively form the macroinitiator. For example, polymerization may be initiated by heating the mixture with continued agitation to a temperature between at or greater than about 90° C., e.g., 90°-130° C. Polymerization is continued by maintaining the mixture at the selected temperature until desired conversion of the monomer or monomers to polymer has been reached. For example, this may be on the order of several hours.

The living macroinitiator does not need to be purified or isolated prior to being introduced into the aqueous emulsion. In other words, the mixture obtained from step (a) containing living macroinitiator and unreacted monomers) can be directly added to step (b). Thus, the aqueous living macroinitiator, as obtained (e.g., containing unreacted AMPS monomer), may be directly reacted with the monomer mix.

An emulsion comprising at least one monomer, the living macroinitiator formed in step (a), and a solvent, but exclusive of a surfactant, is prepared. The emulsion is maintained under polymerization conditions to provide a latex containing dispersed polymer particles. Any suitable conditions may be selected to effectively convert the mixture to a latex. For example, the macroinitiator is employed in an amount sufficient to cause polymerization. As above, the polymerization may be initiated by heating the emulsified mixture with continued agitation to a temperature between at or greater than about 90° C., e.g., 90°-130° C. Polymerization is continued by maintaining the emulsified mixture at the selected temperature until conversion to latex has been reached.

The manner of combining the polymerization ingredients in forming the living macroinitiator or in forming the polymer particle dispersions can be by various known feed methods, such as, continuous monomer addition, incremental monomer addition, or addition in a single charge of the entire amount of monomers (i.e., batchwise). The entire amount of the aqueous medium with polymerization additives can be present in the polymerization vessel before introduction of the monomers, or alternatively, the aqueous medium, or any portion of it, can be added continuously or incrementally during the course of the polymerization.

Any suitable methods can be used to further treat the emulsion. For example, the polymer particle dispersions may be quenched or chased, which can shorten reaction times and make a product with lower residual monomer levels, using techniques known to those skilled in the art. In other words, the "chasing" step may be used to consume unreacted monomer. Conventional water-soluble initiators such as potassium persulfate or initiator/reductant ("redox") pairs, such as t-butyl hydroperoxide and sodium formaldehyde sulfoxylate, for example, can be used to polymerize residual monomers. Additionally, the addition of reducing agents can destroy the control agent, thereby increasing rate while decreasing the controlled nature of the polymerization.

Following polymerization, the solids content of the resulting aqueous polymer latex can be adjusted to the level desired by the addition of water or by the removal of water, e.g., by distillation. The polymer particles can be recovered from the aqueous dispersion, if desired. The size of the polymer particles may vary. Suitable particle sizes may be achieved directly from the polymerization. Screening of the resulting latex may also be used to remove larger particles or to narrow the particle size distribution.

EXAMPLES

Example 1

Preparation of 3 kg/mol poly(AMPSNa) Macroinitiator and poly(AMPSNa-b-BA-b-BA/MMA/St) Surfactant-Free Latex The following ingredients were weighed into a 2 L stainless steel reactor: 389.29 g of 50 wt % AMPS-Na(aq.), 2.265 g SG1, 481.515 g de-ionized water, 24.805 g BB-MA (obtainable from Arkerna Inc. with offices in Philadelpha, Pa., 6.50× $10^{-2}$ moles, target $M_n \approx 3.0$ kg/mol), and 17.296 g of 20 wt % NaOH(aq.). The mixture is diluted with 178.71 g deionized water and degassed with nitrogen for 10 minutes. The mixture is heated with stirring at 95-105° C. for 4 hours. The product was collected (about 95% cv AMPSNa). The aqueous macroinitiator solution (pAMPSNa) or polymerized-AMPSNa) was used without further purification.

Into a 2 L stainless steel reactor, 653.2 g de-ionized water, 2.42 g of sodium carbonate and 80.4 g aqueous p(AMPSNa) macroinitiator solution was added. To this homogeneous solution, 16.8 g butyl acrylate (BA) was added. The mixture was bubbled with nitrogen while stirring, then heated at 100° C. for 2 hours (95% cv BA). The resulting latex is about 4.8% solids with low particle size.

To 752 g of the above latex, 424.2 g BA, 35.0 g styrene, 224.0 g methyl methacrylate (MMA) was added, with stirring. The polymer was reacted to 92% conversion of MMA before adding conventional free radical initiator(s) to "chase" residual monomer. A solution of 3.22 g of sodium formaldehyde sulfoxylate and 32.2 g deionized water was added to the latex and held at 100° C. for 15 minutes, followed by the addition of 3.79 g n-octyl mercaptan, then 1.89 g t-butyl hydroperoxide and 16.5 g of de-ionized water. The polymer was reacted for 2 hours at 108° C., to 99+% conversion of monomer.

Example 2

Preparation of 2.8 kg/mol poly(Hydroxyethyl Acrylate) and poly(Hydroxyethyl Acrylate-b-MMA) Surfactant-Free Latex A non-ionic first block was prepared from hydroxyethyl acrylate. 5.0400 g hydroxyethyl acrylate (HEA), 9.949 g de-ionized water, 0.174 g of sodium carbonate, and 0.682 g of BB-MA ($1.79 \times 10^{-3}$ moles, target $M_n \approx 2.8$ kg/mol), were polymerized for 3 hours at 90° C. (98% cv HEA).

1.2626 g of this low molecular weight aqueous p(hydroxyethyl acrylate) solution was added to a vial with 11.424 g of de-ionized water and 3.514 g MMA. The mixture was polymerized for 1 hour at 100° C., reaching 65% conversion of MMA. Although the particle size was bimodal, the latex was stable.

Example 3

Preparation of a poly(AMPSNa-b-BA-b-MMA/BA-Gradient) Triblock Copolymer Surfactant-Free Latex 50 kg/mol pBA first block was prepared using a 2 kg/mol p(AMPSNa) macroinitiator. To a 2-L Parr high-pressure reactor was charged: 257.7 g de-ionized water, 0.43 g NaHCO$_3$, 35.3 g of 14.4 wt % aqueous p(AMPSNa) macroinitiator solution (5.1 g p(AMPSNa), $2.54 \times 10^{-3}$ moles, $M_n \approx 2.0$ kg/mol) and 149.5 g butyl acrylate (BA). The reactor was sealed, agitated, sparged with nitrogen and heated at 120° C. until 85% BA conversion was obtained. The reactor was then cooled to room temperature. The latex had 28.4% solids and an intensity-average particle size, $D_I$=130 nm.

The p(MMA-co-BA) gradient copolymer second block was prepared as follows. 80.5 g methyl methacrylate was added to the above latex. The reactor was sealed, agitated, sparged with nitrogen and heated at 105° C. until reaching 69.5% MMA conversion and 51% conversion of the residual BA. At this point, the latex had 36.9% solids and $D_I$=143.1 nm. With the reactor at 105° C., a solution of 0.61 g sodium formaldehyde sulfoxylate and 10.0 g de-ionized water was charged to the reactor via peristaltic pump. After 1 hour, all monomer conversions were >99+%. Final latex was 42.6% solids and $D_I$=158 nm. Block copolymer composition (in wt. %, based on GC conversion) was 2.2% p(AMPSNa), 55.6% pBA, and 42.2% p(MMA$_{80.3\%}$/BA$_{19.7\%}$).

Example 4

Preparation of a poly(AMPSNa-b-Ba-b-MMA/MAA/BA-Gradient) Triblock Copolymer Surfactant-Free Latex 3 kg/mol pBA first block was prepared using a 2 kg/mol p(AMPSNa) macroinitiator. To a 2-L Parr high-pressure reactor was charged: 853.3 g de-ionized water, 3.57 g Na$_2$CO$_3$, 0.14 g NaOH, 39.80 g of 42.4 wt % aqueous p(AMPSNa) macroinitiator solution (16.8 g p(AMPSNa), $5.60 \times 10^{-3}$ moles, $M_n \approx 2.0$ kg/mol) and 16.8 g butyl acrylate. The reactor was sealed, agitated, sparged with nitrogen and heated at 100° C. for 1 hour, resulting in 100% BA conversion. The reactor was cooled to room temperature. The latex had 25% solids and an intensity-average particle size, $D_I$=373 nm.

The p(MMA-co-MAA-co-BA gradient copolymer) second block was prepared as follows. 246.8 g methyl methacrylate, 10.7 g methacrylic acid (MAA), and 428.54 g butyl acrylate was added to the above latex. The reactor was sealed, agitated, sparged with nitrogen and heated at 108° C. for 10 hours, followed by heating at 110° C. for 12 hours resulting in 97.5% MMA conversion, 100% MAA conversion, and 86.7% BA conversion (91% global monomer conversion). The reactor was cooled to room temperature. The latex had 38.8% solids and $D_I$=260 nm.

The residual monomers were "chased" via conventional free radical initiators. To the above latex was added a solution of 1.42 g n-octyl mercaptan, 1.10 g sodium formaldehyde sulfoxylate and 10.8 g de-ionized water. The reactor was sealed, agitated, sparged with nitrogen and heated to 70° C., after which a solution of 0.7 g t-butyl hydroperoxide and 6.0 g de-ionized water was charged to the reactor via peristaltic pump. After 1 hour at 70° C., all monomer conversions were >99+%. Final latex had 40.6% solids and $D_I$=259 nm. Block copolymer composition (in wt. %, based on GC conversion) was 2.6% p(AMPSNa), 2.6% pBA, and 94.9% p(MMA$_{38.6\%}$/MAA$_{1.7\%}$/BA$_{59.6\%}$).

Example 5

Stability of a poly(AMPSNa-b-BA-b-MMA/BA-Gradient) Triblock Copolymer Surfactant-Free Latex at Low pH An aliquot of the latex in Example 3 was titrated with 0.8% HCl(aq.) until pH<3.

| Description | pH | Duration | $D_I$ (nm) | Coagulation |
|---|---|---|---|---|
| Ex. 3 latex | 6 | — | 160.3 | none |
| Ex. 3 latex | 3 | — | 155.5 | none |
| Ex. 3 latex | 3 | 1 week | 161.2 | none |
| Ex. 3 latex | 3 | 6.5 weeks | 155.3 | none |
| Ex. 3 latex | 3 | 88 weeks | 154.9 | none |

Example 6

Preparation of 5 kg/mol poly(Hydroxyethyl Methacrylate-co-AMPSNa) and poly(HEMA/AMPS)-b-PMMA Surfactant-Free Latex A mixed sulfonate/hydroxyl first block was prepared from hydroxyethyl methacrylate. 2.153 g hydroxyethyl methacrylate (HEMA), 12.7742 g of 50 wt % AMPS—Na(aq.), 0.021 g SG1, 1.580 g de-ionized water, and 0.649 g of BB-MA ($1.79 \times 10^{-3}$ moles, target $M_n$ 5 kg/mol), were polymerized for 2 hours at 85° C. (98% cv HEMA).

1.7188 g of the above low molecular weight aqueous solution was added to a vial with 11.1949 g of de-ionized water and 5.4146 g MMA. The mixture was polymerized for 2 hours at 90° C., reaching 33% conversion of MMA. Di=152 with narrow distribution (1.17).

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A method of making an aqueous dispersion of polymer particles comprising:

reacting (i) an ethylenically unsaturated monomer selected from the group consisting of (meth)acrylates, styrenes, (meth)acrylamides, (meth)acrylonitriles, and mixtures thereof with (ii) a living macroinitiator, in an aqueous media and without a surfactant to effect polymerization of the ethylenically unsaturated monomer, wherein the macroinitiator, formed via nitroxide-mediated or reversible-addition-fragmentation-transfer (RAFT) polymerization, is a hydrophilic, pH-insensitive monomer, in polymerized form, selected from the group consisting of 2-acrylamido-2-methylpropanesulfonic acid (AMPS) and salts thereof and wherein said polymer particles have the formula R-$\{[(A)_x(B)_y]$-$[(C)_m]_p$-$Y\}_{n \text{ or } 1}$, where A is the hydrophilic, pH-insensitive monomer, B is a comonomer other than A and C, C is the ethylenically unsaturated monomer, Y is a terminal group selected from the group consisting of A, B, C and R, $x \geq 1$, $y \geq 0$, $m \geq 1$, $n \geq 2$, and $p \geq 1$, and A and B may appear in any order or sequence within the living macroinitiator, and R is of the formula (I) or (III):

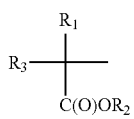

(I)

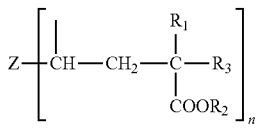

(III)

wherein $R_1$ and $R_3$, identical or different, represent a linear or branched alkyl group, with the number of carbon atoms in the alkyl group from 1 to 3; $R_2$ represents a hydrogen atom or a linear or branched alkyl group having a number of carbon atoms in the alkyl group from 1 to 8, a phenyl group, an alkaline metal ion, or an ammonium ion; and Z represents an aryl group or a group of the formula $Z_1$—[X—C(O)]$_n$, in which, $Z_1$ represents a polyfunctional structure where X is an oxygen atom, a nitrogen atom carrying a carbon group, a hydrogen atom, or a sulfur atom, $n \geq 2$, and said dispersion of polymer particles has a pH less than 7.

2. The method according to claim 1, wherein the ethylenically unsaturated monomer consists of (meth)acrylates.

3. The method according to claim 1, wherein the living macroinitiator is formed by performing a controlled radical polymerization of the hydrophilic, pH-insensitive monomer in the presence of an alkoxyamine compound having either formula (IV) or (V):

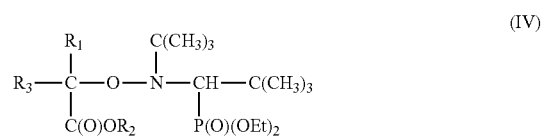

(IV)

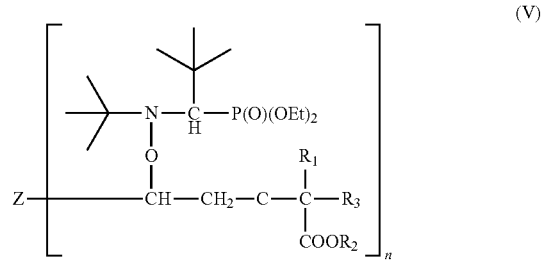

(V)

wherein $R_1$ and $R_3$, identical or different, represent a linear or branched alkyl group, with the number of carbon atoms in the alkyl group from 1 to 3; $R_2$ represents a hydrogen atom, a linear or branched alkyl group having a number of carbon atoms in the alkyl group from 1 to 8, a phenyl group, an alkaline metal ion, or an ammonium ion; Z represents an aryl group or a group of the formula $Z_1$—[X—C(O)]$_n$, in which, $Z_1$ represents a polyfunctional structure where X is an oxygen atom, a nitrogen atom carrying a carbon group, a hydrogen atom, or a sulfur atom; and $n \geq 2$.

4. The method according to claim 3, wherein the macroinitiator is formed in an aqueous media.

5. The method according to claim 3, wherein the alkoxyamine compound is N-(2-methylpropyl)-N-(1-diethylphosphono-2,2,-dimethylpropyl)-O-(2-carboxylprop-2-yl) hydroxylamine.

6. The method according to claim 3, wherein during the controlled radical polymerization of the hydrophilic, pH-insensitive monomer and the alkoxyamine compound, a nitroxide compound is added.

7. The method according to claim 3, wherein a non-sulfonated monomer is copolymerized with the hydrophilic, pH-insensitive monomer.

8. The method according to claim 3, wherein the living macroinitiator is prepared with a reversible-addition-fragmentation-transfer (RAFT) agent.

* * * * *